United States Patent
Malone

(10) Patent No.: US 6,213,912 B1
(45) Date of Patent: Apr. 10, 2001

(54) LOW SPEED RETURN

(75) Inventor: Johnathan E. Malone, Knoxville, TN (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/437,613

(22) Filed: Nov. 10, 1999

(51) Int. Cl.$^7$ .......................... F16H 59/74; F16H 61/16; F15B 13/044
(52) U.S. Cl. ................................ 477/99; 477/125; 91/459
(58) Field of Search ............................. 477/97, 99, 115, 477/125, 901, 902; 91/459

(56) References Cited

U.S. PATENT DOCUMENTS

| | | | |
|---|---|---|---|
| 3,574,288 | * | 4/1971 | Barth ...................................... 477/99 |
| 3,748,929 | * | 7/1973 | Green ...................................... 477/97 |
| 4,542,721 | * | 9/1985 | Williams ................................ 477/99 |
| 4,981,052 | * | 1/1991 | Gierer ................................... 477/125 |
| 5,078,104 | | 1/1992 | Peterson, Jr. ..................... 123/179.24 |
| 5,314,038 | | 5/1994 | Peterson, Jr. .......................... 180/214 |
| 5,513,551 | * | 5/1996 | Morishita ............................... 91/459 |
| 5,778,330 | * | 7/1998 | McKee ............................... 477/99 X |
| 5,809,441 | * | 9/1998 | McKee ............................. 477/125 X |
| 6,145,312 | * | 11/2000 | Hauser et al. ..................... 91/459 X |

* cited by examiner

*Primary Examiner*—Charles A. Marmor
*Assistant Examiner*—Roger Pang

(57) ABSTRACT

A vehicle speed control system includes a high speed/low speed selection switch and a speed control relay connected to a voltage source through a switched power line. The speed selection switch includes an input connected to the power line through the speed control relay. One output on the speed control switch is connected to an electrohydraulic valve which controls the speed range on a vehicle. The state of the electrohydraulic valve is dependent both on the switch position and on the state of the relay. The relay is deactivated when the power line is switched off and changes back to an activated state to allow high speed operation only if the speed selection switch is first placed in the low speed position after the vehicle power line is switched on. If the selection switch is in the high speed position when the power line is on, the speed control relay will remain inactivated until the selection switch is moved to the low speed position. Thereafter, movement of the selection switch to the high speed position with the switched power line on and the speed control relay activated activates the electrohydraulic valve to place the vehicle in the high speed condition. The operator therefore must change a switch position before high speed operation after start up, regardless of the position of the speed selection switch on start up. A similar circuit utilizing a three position switch provides hydraulic system flow control with high flow inhibited until the operator manually changes the position of the switch.

14 Claims, 2 Drawing Sheets

LOW SPEED RETURN

BACKGROUND OF THE INVENTION

1) Field of the Invention

The present invention relates generally to hydraulic controls for a variable output hydraulic device such as a transmission or hydraulic flow system on a vehicle, and more specifically, to a simple circuit for inhibiting initial high speed or high volume operation of such a system upon start up of the vehicle.

2) Related Art

Utility vehicles such as skid steer loaders often include a hydraulically driven transmission having low speed and high speed operation. Valves on the transmission are electronically controlled to select speed, and a switch or other transmission speed select control at the operator console connected to the valve solenoid of one of the valves allows the operator to choose either the low speed or high speed range. In many systems, if the operator shuts down the vehicle with the select control in a high speed position, the high speed operation selection will carry over after the next start up unless the operator manually moves the select control.

It is often desirable to have vehicle operation after start up commence in the low speed range rather than the high speed range. Assuring that the low speed range is selected regardless of the position of the selection control can require complicated mechanical or electrical interlocks or interlock circuitry. Arrangements that only allow vehicle starting only if the low speed is manually selected can be complex and expensive and can be confusing to the operator.

Other hydraulic systems on the vehicle may have electrohydraulic valves or similar control devices for providing a variable hydraulic output. In many applications it is desirable to inhibit high flow or volume output upon vehicle start up.

BRIEF SUMMARY OF THE INVENTION

It is therefore an object of the present invention to provide an improved system for returning a transmission to a low speed range after vehicle shut down. It is a further object to provide such an improved system which has a manual operator control and which obviates need for the operator to move the control to the low speed range at start up.

It is a further object of the present invention to provide an improved system for returning a transmission to the low speed range which is very simple and inexpensive in construction and which has an easy to understand operation. It is a further object to provide such a system which has a simple manually operated control and which assures initial vehicle operation in the low speed range unless the operator moves the control after start up of the vehicle.

It is still another object of the present invention to provide an improved system for a hydraulic system having an electronically operated valve or other fluid control device with a manually controlled switch for varying device output between a low volume operation and a higher volume operation, wherein after shut down of the system, the low volume operation will be initially provided upon start up regardless of the switch position on powering up. It is a further object to provide such a system wherein the switch must be operated after powering up to select the high volume operation.

A vehicle speed control system constructed in accordance with the teachings of the present invention includes a high speed/low speed selection switch and a speed control relay connected to a voltage source through a switched power line. The speed selection switch includes an input connected to the power line via the speed control relay. One output on the speed control switch is connected to an electrohydraulic valve which controls the speed range on a vehicle. The state of the electrohydraulic valve is dependent both on the switch position and on the state of the relay. The relay is deactivated when the power line is switched off and changes back to an activated state to allow high speed operation only if the speed selection switch is in or is placed in the low speed position after the vehicle power line is switched on. If the selection switch is in the high speed position when the power line is on, the speed control relay will remain inactivated until the selection switch is moved to the low speed position. Thereafter, movement of the selection switch to the high speed position with the switched power line on and the speed control relay activated activates the electrohydraulic valve to place the vehicle in the high speed condition.

A system with a control switch and relay similar to that of the speed control system may also be utilized with a variable flow hydraulic system which provides additional hydraulic flow to auxiliary equipment powered by the vehicle. A control switch includes off, run and on positions and is connected to flow control relay and to a switched power line. In the off position of the switch, or when the power line is off, the relay deactivates to provide low hydraulic flow. Thereafter, to bootstrap the relay to the on position and select the high hydraulic flow, the switch must first be moved to the on position before being released to the run position.

The control system is relatively simple and inexpensive and prevents high speed vehicle operation or high volume hydraulic fluid flow until the operator manually changes the selection switch, even if the switch is in the high speed or high volume position when the vehicle is powered up. Complicated and expensive interlock linkages or circuits are eliminated, and system operation is easy and straightforward.

These and other objects, features and advantages of the present invention will become apparent to one skilled in the art upon reading the following detailed description in view of the drawings.

DETAILED DESCRIPTION OF THE DRAWING

Figure 1:
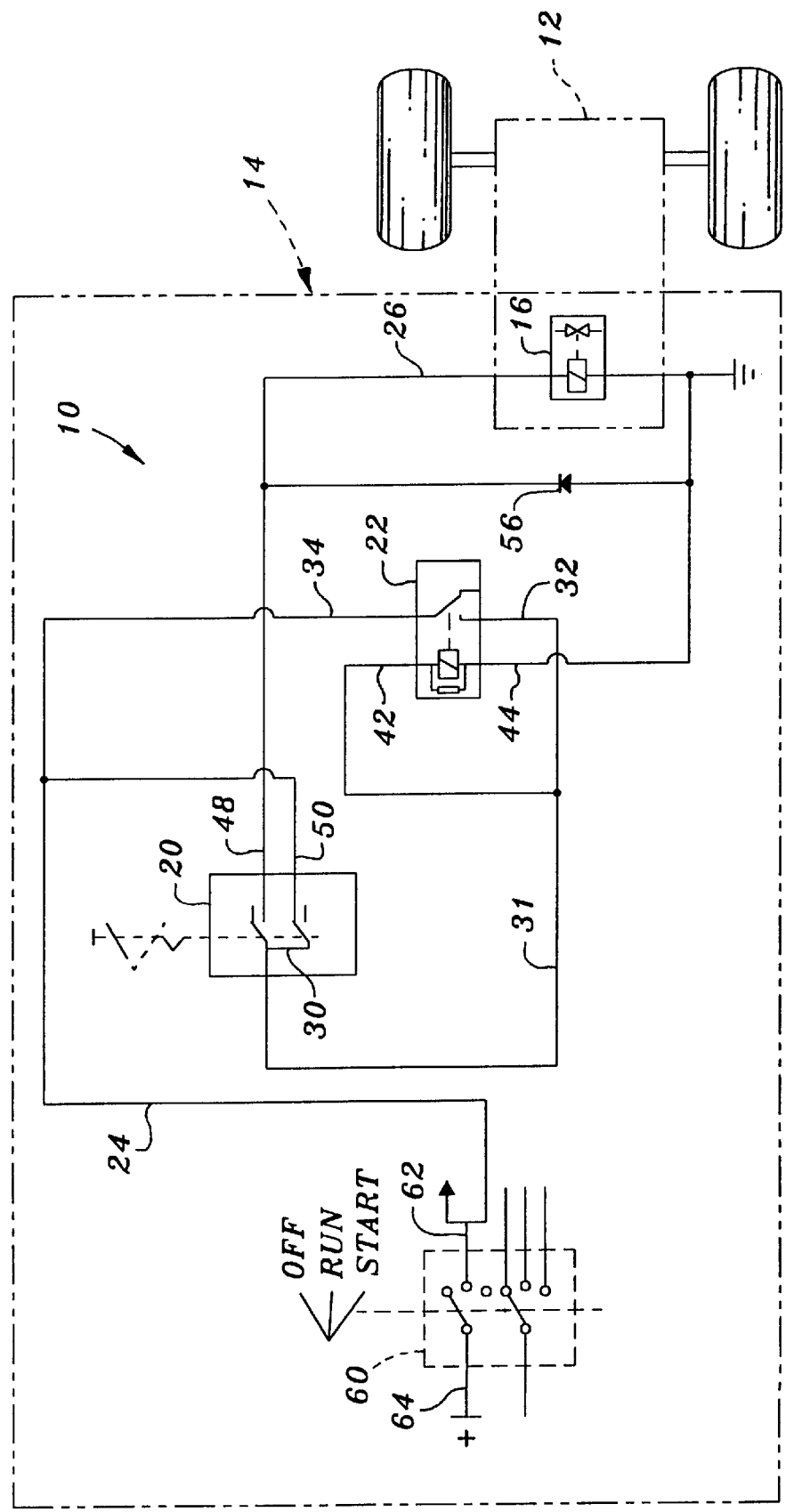
FIG. 1 shows a schematic of the speed control system for use with a vehicle having a speed control valve.

Referring now to FIG. 1, therein is shown a speed control system 10 for controlling a hydraulic transmission 12 having a high speed and low speed output for moving a vehicle 14 such as a skid steer loader over two or more ranges of speed. An electrohydraulic transmission speed control valve 16 provides the high speed range of operation when activated and the low speed range of operation when deactivated.

To control the speed range, a speed selection switch 20 and a speed control relay 22 are connected between a switched power line 24 and a control input 26 of the speed control valve 16. The switch 20 includes input terminals 30 which are connected by a line 31 to each other and to a switched output terminal 32 on the relay 22. An opposite terminal 34 of the relay 22 is connected to the switched power line 24. The input terminals 30 are also connected to a control input 42 of the solenoid coil of relay 22. The opposite terminal 44 of the coil is grounded.

The speed selection switch 20 as shown in FIG. 1 has a first or low speed position (upper position as shown) wherein output terminal 48 connected to the line to the control input 26 is open so no power is applied to the speed control valve 16 and the low speed range of operation is provided. In the first position, a second output terminal 50 is connected through the switch to the line 31 to provide a closed path between the switched power line 24 and the control input 42 of the relay 22. Therefore, when the line 24 is powered and the switch 20 is in the low speed position as shown in FIG. 1, the relay 22 will activate to provide a closed path between the terminals 32 and 34 and connect the line 24 with the control input 42 so the relay is bootstrapped into the on condition as long as the line 24 is powered. However, since the path to the control input 26 is open when the switch 20 in the low speed position shown, the speed control valve 16 will be deactivated and the low speed range will be established by the valve 16. To establish high speed operation, the operator moves the switch 20 down from the position shown in FIG. 1 to establish a closed circuit from the control input 26 to the powered line 24 via terminals 48 and 30 of the switch 20 and terminals 32 and 34 of the relay 22. The valve 16 activates for high speed operation.

If the line 24 becomes unpowered for any reason, the relay 22 will deactivate and open the circuit between the line 24 and the valve 16. When the line 24 is powered again, the relay 22 can only be bootstrapped into the activated condition by first having the switch 20 in the low speed position. Therefore, if the operator has the switch 20 in the high speed position when the line 24 becomes powered, the relay 22 will not activate until the switch 20 is first moved up to the low speed position to power the control input 42 via terminals 30 and 50. The system is constrained to operate in the low speed condition until the operator moves the switch 20 after power up of the line 24 thereby preventing inadvertent initial high speed operation. A diode 56 is connected across the solenoid of the valve 16 to limit voltage spikes.

As shown in FIG. 1, the line 24 is connected to a conventional ignition control switch 60 on the vehicle 14. The switch 60 has off (shown), run, and start positions and includes a terminal 62 connected to the line 24. When the switch 60 is in the second or on position (or in an accessory position if an accessory position is provided on the switch), system power is provided to the line 24 via output terminal 62 and an input terminal 64 connected to the power source such as the battery or alternator on the vehicle 14. When the switch 60 is off or in the start position, power is removed from the line 24. Therefore, when the vehicle 14 is started or when the switch 60 is placed in the off position, the relay 22 will be deactivated. When the line 24 is again powered by movement of the ignition switch to the on (or accessory) position, the switch 20 must first be in the low speed position (shown) to activate the relay 22 and enable high speed selection by the switch 20.

Figure 2:
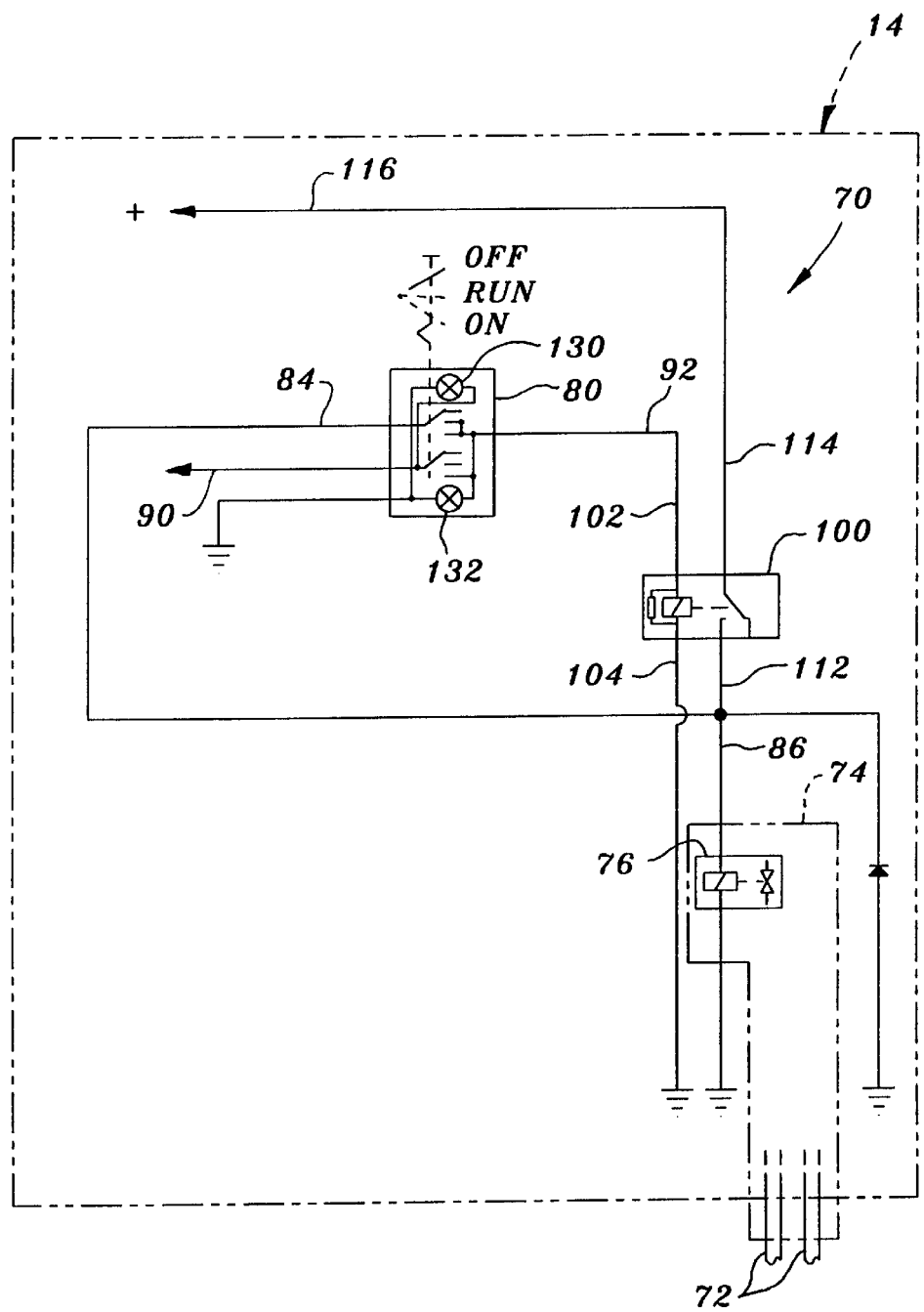
FIG. 2 is a schematic of a hydraulic system flow control system.

Referring now to FIG. 2, a hydraulic flow control system 70 is shown for selectively powering auxiliary hydraulic lines 72 of a hydraulic system 74 on the vehicle 14. A conventional source of hydraulic fluid (not shown) is connected through a high flow/low flow electrohydraulic control valve 76. A three position flow control switch 80 includes an off position (shown), a central run position, and a lowermost momentary on position. A switch terminal 84 is connected to input control line 86 of the valve 76. A second switch terminal 90 is connected to a source of control power on the vehicle, such as the line 26 from the ignition switch. An output terminal 92 is connected to the switch contacts such that an open circuit is provided to the terminal 92 when the switch 80 is off, the terminal 84 is connected to the terminal 92 when the switch is in the run or on positions, and a connection between the terminals 84 and 90 is established when the switch is in the on position.

A high flow relay 100 includes a control input 102 connected to the terminal 92 of the switch 80 and an opposite terminal 104 which is grounded. A switched relay terminal 112 is connected to the control line 86 of the valve 76 and to the switch terminal 84. The opposite terminal 114 is connected to a switched power line 116 having a powered condition and an unpowered condition. As can be seen from FIG. 2, when the relay 100 is deactivated (shown), the relay 100 can only be activated by moving the switch 80 to the lowermost or momentary on position while terminal 90 is powered (i.e., while the ignition switch is in the on or accessory position) to establish a closed circuit between the terminals 90 and 92 and power the solenoid of the relay 100. The relay 100 will activate and establish a closed circuit between the line 116 and the control terminal 102 via terminals 114,112 and 84,92. If the line 116 is powered, the relay 100 will be bootstrapped into the on position if the switch 80 is in the run or the momentary on position and the control valve 76 will be activated to provide the high flow condition to the lines 72. When the operator releases the switch 80, the switch moves to the run position.

If for any reason the line 116 becomes unpowered, the relay 100 will deactivate and the valve 76 will return to the low flow condition. The relay 100 can then only be reactivated by manually moving the switch 80 to the momentary on position while terminal 90 is powered. Therefore, inadvertent start up of the system in the high flow condition is prevented. A back light 130 illuminates the switch area when the terminal 90 is powered. A second indicator light 132 is connected between the terminal 92 and ground and provides a signal to the operator when the high flow relay 100 is powered.

Having described the preferred embodiment, it will become apparent that various modifications can be made without departing from the scope of the invention as defined in the accompanying claims.

I claim:

1. A hydraulic flow control system including:

an electronically controlled hydraulic valve providing first and second hydraulic flow levels, the second flow level being substantially greater than the first;

a flow control relay having an activated state and a deactivated state, the relay including a switched output line connected to the valve and establishing the second hydraulic flow level when the relay is in the activated state, and a control terminal for changing the state of the relay;

a flow level selection switch connected to control terminal and having first and second positions corresponding to the first and second flow levels respectively;

a power line having an on and an off condition connected to the flow control relay, wherein the relay is in the deactivated state when the power line is in the off condition; and wherein the flow control relay, once in the deactivated state, remains in the deactivated state so the second hydraulic flow level cannot be established even if the flow level selection switch is in the second position, until the position of the flow level selection switch is changed after the deactivation thereby preventing the second flow level after the power line moves to the off condition until the level selection switch is operated.

2. The flow control system as set forth in claim 1 wherein flow level selection switch initiates a bootstrapping effect to the relay to hold the relay in the activated position when the power line is on, and wherein the bootstrapping effect is initiated only when the flow level selection switch is in a position other than the second position.

3. The flow control system as set forth in claim 2 wherein the bootstrapping effect is initiated with the flow level selection switch in the first position.

4. The flow control system as set forth in claim 2 wherein the flow level selection switch includes a third position, wherein the bootstrapping effect is initiated with the flow level selection switch in the third position.

5. The flow control system as set forth in claim 1 wherein the hydraulic valve comprises a two speed transmission valve.

6. The flow control system as set forth in claim 1 wherein the hydraulic valve comprises a low flow/high flow control valve of a hydraulic fluid system.

7. The flow control system as set forth in claim 1 further comprising an ignition switch having an output terminal connected to the power line, and wherein the ignition switch has an off, a run and a start position, and the output terminal maintains the power line in the off condition when the ignition switch is in either the off position or the start position so that the second hydraulic flow level is inhibited after the ignition switch is placed in the off or the start positions until the level selection switch is operated.

8. In a speed system for an operable vehicle having a source of electrical power, a switched line selectively connected to the source and having a powered condition when the vehicle is started, and an unpowered condition when the vehicle is shut down, a transmission with an electronically controlled element providing first and second speed ranges controllable by an operator, a speed control for selecting transmission speed range and for selectively preventing operation of the transmission in the second speed range, the speed control comprising:

an operator control switch movable between first and second positions and connected to the source and to the electronically controlled element;

a speed control relay connected to the switched line and to the operator control switch, the control relay having an activated condition and an deactivated condition, the relay assuming the deactivated condition when the switched line is in the unpowered condition;

wherein the electronically controlled element facilitates transmission operation in the second speed range when the operator control switch is in the second position and the relay is activated; and wherein, after shut down of the vehicle, the relay remains deactivated until the control switch is moved to the first position, thereby preventing immediate operation of the transmission in the second speed range if the switch is in the second position when the vehicle is started.

9. The speed control as set forth in claim 8 wherein the speed control relay includes control line connected through the operator control switch to the switched line when the operator control switch is in the first position.

10. The speed control as set forth in claim 9 wherein the control line is also connected to the an output of the relay to bootstrap the relay to the activated condition upon activation of the relay.

11. The speed control as set forth in claim 8 wherein the operator control switch includes an input terminal connected to the a switched output of the relay.

12. The speed control as set forth in claim 11 wherein the operator control switch includes an output terminal connected to the switched line and connected to a control input of the relay when the operator control switch is in the first position.

13. A drive system for a vehicle comprising:

a switched power line having an on condition and an off condition;

a drive including a controllable valve having first and second states corresponding to first and second vehicle drive speed ranges;

a speed selector switch having an output terminal connected to the controllable valve and a second terminal connected to the switched power line, the selector switch having first and second positions for selecting the first and second drive speed ranges, respectively;

a relay having a control terminal connected to the selector switch and a switched output terminal connected to the switched power line, the relay having an activated state and deactivated state, wherein when the switched power line is in the off condition the relay assumes the deactivated state;

a feedback line connected between the switched output terminal and the control terminal and bootstrapping the relay to the activated state upon relay activation, the control terminal also connected to the speed selector switch, wherein when the relay is deactivated the controllable valve assumes the first state regardless of the position of the speed selector switch and wherein the selector switch must be moved to the first position with the switched power line in the on condition to select the second vehicle drive speed range thereby preventing vehicle operation in the second speed range until the position of the selector switch is changed after the switched power line goes to the off condition.

14. The drive system set forth in claim 13 wherein the switched power line is connected to a vehicle start switch, the power line going to the off condition when the start switch is activated.

* * * * *